United States Patent
Baer et al.

(10) Patent No.: US 8,655,321 B2
(45) Date of Patent: Feb. 18, 2014

(54) ADAPTIVE NOTIFICATIONS

(75) Inventors: Matthias Baer, Seattle, WA (US); Jesse Sage Schreiner, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/084,027

(22) Filed: Apr. 11, 2011

(65) Prior Publication Data

US 2012/0258691 A1    Oct. 11, 2012

(51) Int. Cl.
*H04M 1/663* (2006.01)

(52) U.S. Cl.
USPC .......................... 455/412.2; 709/206; 705/14

(58) Field of Classification Search
USPC .......................... 455/412.2; 709/206; 705/14
See application file for complete search history.

(56) References Cited

U.S. PATENT DOCUMENTS

| | | | |
|---|---|---|---|
| 7,127,485 B2 | 10/2006 | Caruso et al. | |
| 7,496,630 B2 | 2/2009 | Arellano et al. | |
| 2003/0118015 A1* | 6/2003 | Gunnarsson et al. | 370/389 |
| 2004/0223485 A1 | 11/2004 | Arellano et al. | |
| 2005/0289243 A1 | 12/2005 | McInerney | |
| 2006/0014569 A1 | 1/2006 | DelGiorno | |
| 2007/0028185 A1* | 2/2007 | Bhogal et al. | 715/808 |
| 2007/0179852 A1* | 8/2007 | Martin et al. | 705/14 |
| 2010/0042470 A1 | 2/2010 | Chang et al. | |
| 2010/0205259 A1* | 8/2010 | Vitaldevara et al. | 709/206 |
| 2012/0203851 A1* | 8/2012 | Hardy et al. | 709/206 |

OTHER PUBLICATIONS

International Search Report and Written Opinion for PCT/US2012/032022, dated Aug. 29, 2012, 8 pages.
Kasai et al., "Adaptive Notification System Guaranteeing Message Reachability," *Proceedings. International Conference on Pervasive Services*, Jul. 2005, pp. 208-217.
Brander et al., "Implementing Adaptive Mobile Notification Services: A Model Based Approach," *Southern African Networks and Applications Conference (SATNAC)*, Aug. 2006, 6 pages.
Wesson, "Using Context-awareness to Support Adaptive Multimodal Mobile Notification," *International Journal of Computing and ICT Research*, Special Issue, Oct. 2010, pp. 312-326.

* cited by examiner

*Primary Examiner* — Charles Shedrick
(74) *Attorney, Agent, or Firm* — Aaron Chatterjee; Andrew Sanders; Micky Minhas

(57) ABSTRACT

A simplified notification scheme that looks at past behavior of accepting or rejecting messages and modifies whether and/or how future similar notifications are displayed. For example, if a user consistently ignores or rejects a pop-up notification, the system can modify whether or not such a pop-up notification is displayed again. In one specific embodiment, a wireless network can be detected by a mobile phone. The phone can determine whether or not a pop-up notification related to the wireless-network detection should be displayed based on past behavior of the user.

17 Claims, 7 Drawing Sheets

ADAPTIVE NOTIFICATIONS

FIELD

The present application relates generally to receiving notifications, and, more particularly, to adapting notifications based on user behavior.

BACKGROUND

Current wireless and broadband communication technologies bring a variety of notifications using electronic devices, such as mobile phones, computers, televisions, etc. Such notifications help people maintain awareness of interesting information. Sometimes, however, the notifications can be an unwelcome interruption of a user's primary task.

Systems currently exist wherein a user can select different preferences associated with notifications. Such specific and directed user control can help to alleviate unwanted messages. Other systems can adapt notifications by tracking and inferring the user's current state and surrounding circumstances. Such systems can include a model that calculates how easily and clearly a message will be recognized. For example, a system can attempt to calculate the user's attentive state as discerned by his/her current activity. Some systems even attempt to detect whether the user's visual attention is directed towards the phone.

Sophisticated modeling that tracks user location, movement patterns, and user attention can be overly expensive to develop. Additionally, such systems can be slow and prone to error. A simpler system is needed that can eliminate or otherwise reduce unwanted messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present application provides a simplified notification scheme that looks at past behavior of accepting or rejecting messages (affirmatively or through non-action) and modifies whether and/or how future similar notifications are displayed. For example, if a user consistently ignores or rejects a pop-up notification, the system can modify whether or not such a pop-up notification is again displayed.

In one specific example embodiment, a wireless network can be detected by a mobile phone. The phone can determine whether or not a pop-up notification should be displayed based on past behavior of the user. In the example of detection of a wireless network, the pop-up notification originates in the mobile phone itself, as opposed to a push-type notification that results from an email or an SMS message.

In another embodiment, one or more parameters can be analyzed in order to determine a ranking of the notification for the user. If the ranking level exceeds a predetermined threshold, the notification can be displayed. On the other hand, if the ranking level is below the threshold, then the notification can be suppressed. Suppressing could be either canceling the message notification altogether or making the message notification available through affirmative action by the user. Example parameters can include past behavior, system state or context information, or past behavior of other users.

The foregoing and other objects, features, and advantages of the invention will become more apparent from the following detailed description, which proceeds with reference to the accompanying figures.

DETAILED DESCRIPTION

Figure 1:
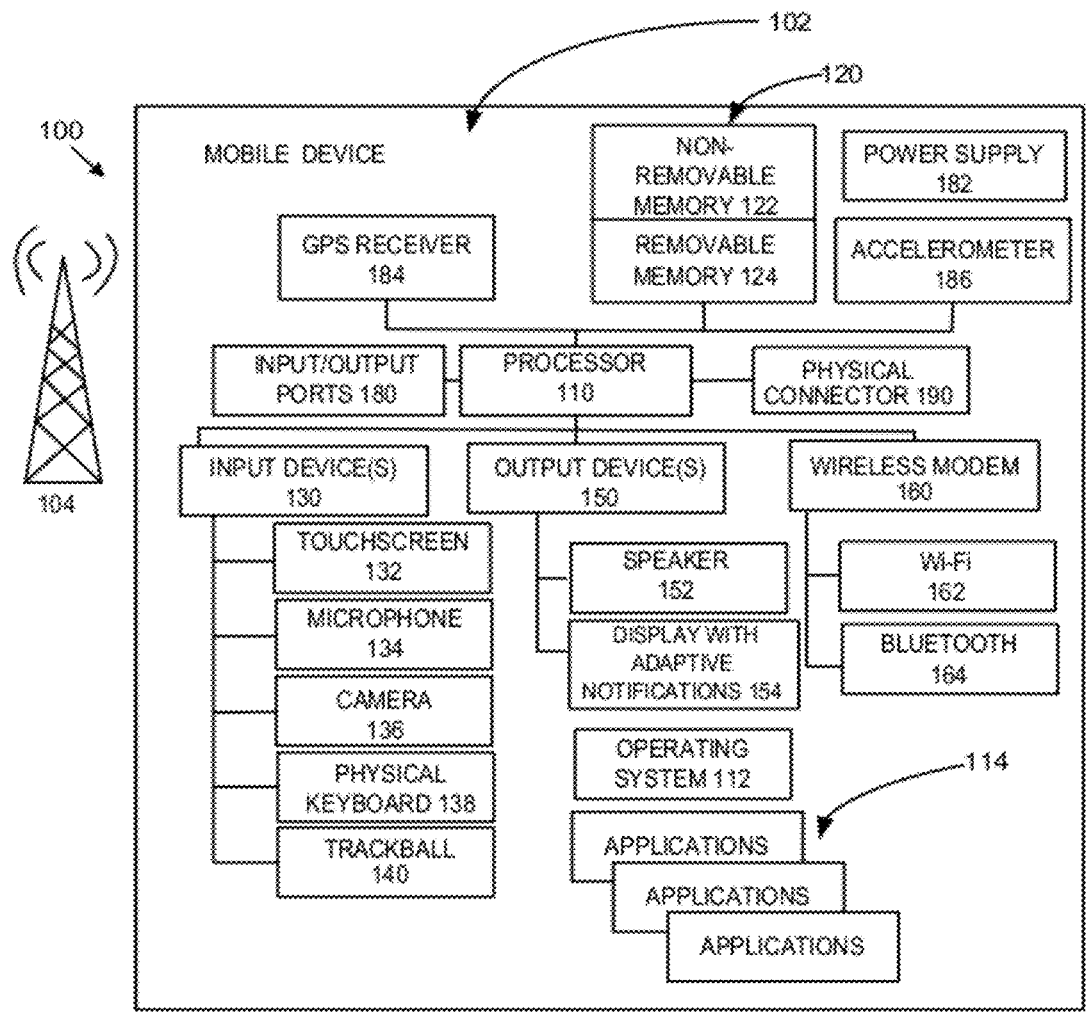
FIG. 1 is an exemplary mobile device according to one embodiment.

FIG. 1 is a system diagram depicting an exemplary mobile device 100 including a variety of optional hardware and software components, shown generally at 102. Any components 102 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 104, such as a cellular or satellite network.

The illustrated mobile device 100 can include a controller or processor 110 (e.g., signal processor, microprocessor, ASIC, or other control and processing logic circuitry) for performing such tasks as signal coding, data processing, input/output processing, power control, and/or other functions. An operating system 112 can control the allocation and usage of the components 102 and support for one or more application programs 114. The application programs can include common mobile computing applications (e.g., email applications, calendars, contact managers, web browsers, messaging applications), or any other computing application.

The illustrated mobile device 100 can include memory 120. Memory 120 can include non-removable memory 122 and/or removable memory 124. The non-removable memory 122 can include RAM, ROM, flash memory, a hard disk, or other well-known memory storage technologies. The removable memory 124 can include flash memory or a Subscriber Identity Module (SIM) card, which is well known in GSM communication systems, or other well-known memory storage technologies, such as "smart cards." The memory 120 can be used for storing data and/or code for running the operating system 112 and the applications 114. Example data can include web pages, text, images, sound files, video data, or other data sets to be sent to and/or received from one or more network servers or other devices via one or more wired or wireless networks. The memory 120 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 100 can support one or more input devices 130, such as a touch screen 132, microphone 134, camera 136, physical keyboard 138 and/or trackball 140 and one or more output devices 150, such as a speaker 152 and a display 154. The display 154 can be used to display adaptive notifications as described herein. Other possible output devices (not shown) can include piezoelectric or other haptic output devices. Some devices can serve more than one input/output function. For example, touchscreen 132 and display 154 can be combined in a single input/output device.

A wireless modem 160 can be coupled to an antenna (not shown) and can support two-way communications between the processor 110 and external devices, as is well understood in the art. The modem 160 is shown generically and can include a cellular modem for communicating with the mobile communication network 104 and/or other radio-based modems (e.g., Bluetooth or Wi-Fi). The wireless modem 160 is typically configured for communication with one or more cellular networks, such as a GSM network for data and voice communications within a single cellular network, between cellular networks, or between the mobile device and a public switched telephone network (PSTN).

Figure 2:
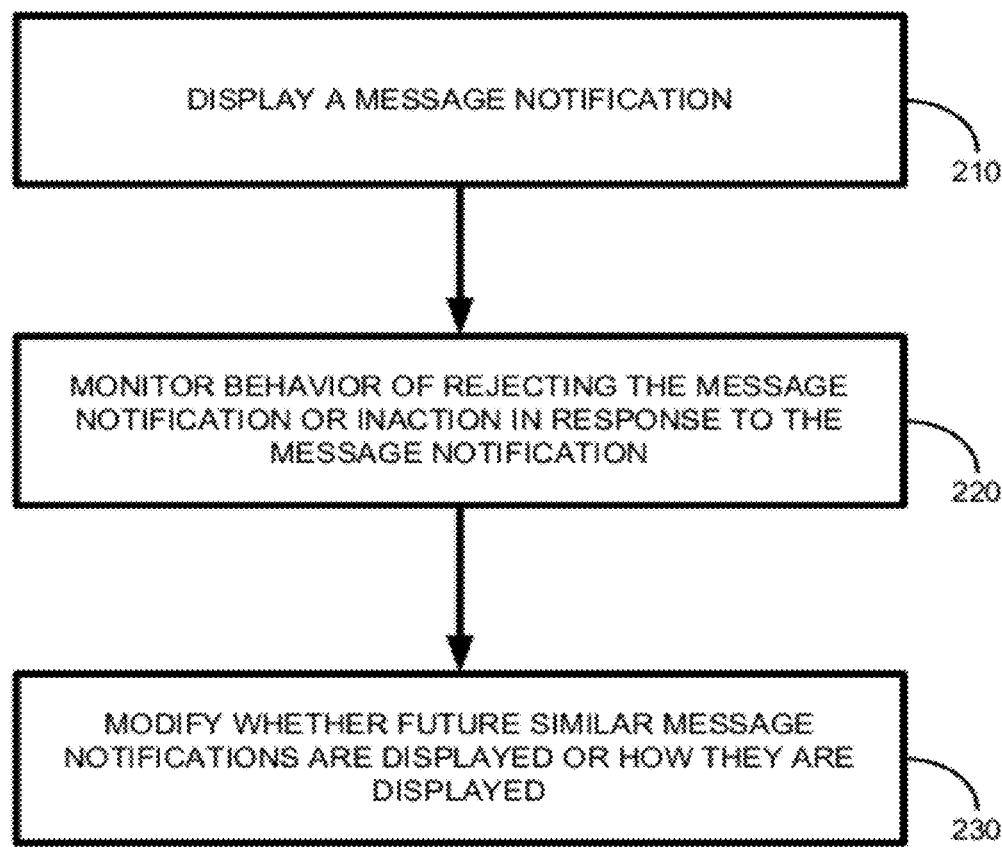
FIG. 2 is a flowchart of a method for modifying notifications based on previous behavior.

The mobile device can further include at least one input/output port 180, a power supply 182, a satellite navigation system receiver 184, such as a Global Positioning System (GPS) receiver, an accelerometer 186, and/or a physical connector 190, which can be a USB port, IEEE 1394 (FireWire) port, and/or RS-232 port. The illustrated components 102 are not required or all-inclusive, as any components can deleted and other components can be added. FIG. 2 is a flowchart of a method for adapting notifications for a user of a mobile device. In process block 210, a first message notification is displayed. For example, the message notification can be a pop-up notification. A pop-up notification is a window that can be sized smaller than a standard window and generally does not include standard features, such as tool bars or status bars. Alternatively, a full functionality window can be displayed as the message notification. In process block 220, the processor 110 or another device can monitor behavior of the user. In particular, the user's behavior is monitored to determine if the user rejects the message notification or otherwise ignores the notification. In either case, the user's response shows a disinterest in the notification. Alternatively, if the user accepts the message notification, then the user's response shows an interest in the notification. An example message notification can be a wireless network notification wherein a mobile phone detects that a wireless network is available. Such notifications are often displayed as a "wi-fi" notification. In one embodiment, rejecting the notification can be through an affirmative selection by pressing the appropriate key or place on a touch display, such as an indication to "cancel" or close the notification. In another embodiment, simply ignoring the notification (i.e., inaction) for a period of time can be considered a rejection. In process block 230, in response to the rejection or inaction, the mobile device modifies whether future similar messages are displayed or how they are displayed. In one embodiment, for example, a simple ranking system can be used, wherein a ranking of the notification is reduced due to the rejection. Such a ranking can be stored in a local database for future use. A frequency in which the message notification is displayed can be correspondingly reduced. In a simple example, if the message is ignored five times in a row, it is not displayed again, or it is displayed only 50% of the time or some other reduced percentage of time. The more the message is rejected or ignored, the lesser percentage of times it is displayed in response to the same event. In another embodiment, for low ranking messages, the message notification can be made available if the user affirmatively searches for the message notification, but the notification is not displayed as an intrusive pop-up window. Thus, the ranking algorithm can be used to change the way in which the notification is displayed or the information provided with the notification can be changed. Using the example of a social networking notification, a notification from a close friend might be displayed differently, or with different information, than a notification from a more distant acquaintance. Likewise, using the example of a notification that has been identified as part of a 'hot' conversation might be treated differently.

The adaptive notifications can also apply to push notifications, such as SMS, instant messaging or email notifications. For example, if a user consistently ignores instant messages from a particular person, future instant messages can be demoted in terms of their ranking. Similarly, if a user consistently rejects or ignores status updates of particular third-party, such updates can be demoted as to the third party. The adaptive notifications can also apply to notifications that originate in the mobile device itself, rather than push notifications. For example, detection of a wireless network is a message notification that originates in the mobile device. Other examples include geo-fencing (based on moving into some new geographic area), wireless devices (e.g., Bluetooth) detected, low battery, roaming status change, time zone change, time change (due to daylight savings), etc.

Figure 3:
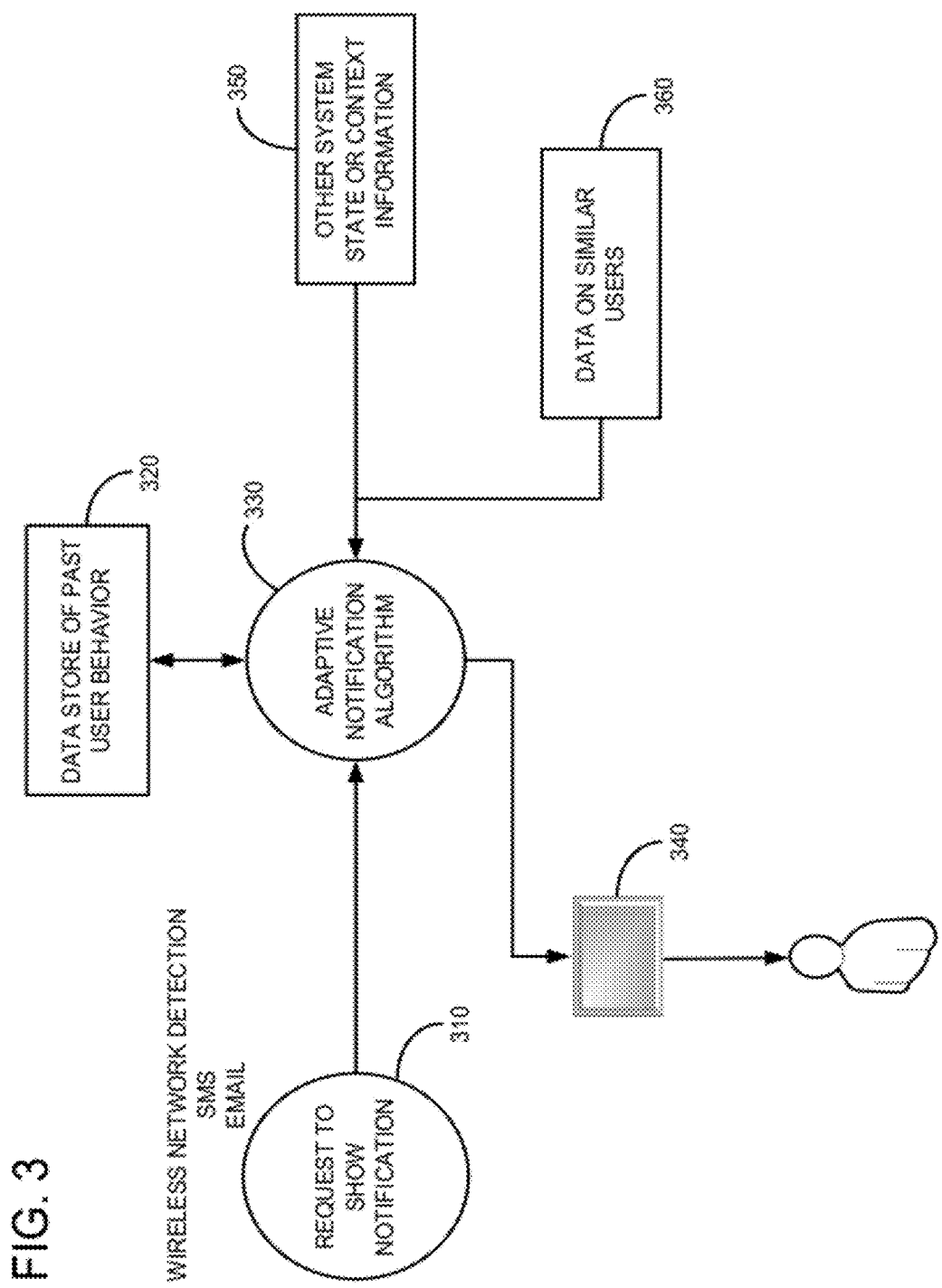
FIG. 3 is an exemplary system for modifying notifications based on potential input parameters.

FIG. 3 shows a system diagram wherein a request to show a notification is received at 310. The notification can be a push-type notification or a notification originating in the mobile device itself. At 320, a data store of past behavior stores information associated with the notifications and how the notifications were responded to previously. At 330, an adaptive notification algorithm receives the request 310 and searches the data store 320 for previous responses to similar requests. Based on the previous responses, the adaptive algorithm 330 can make intelligent decisions about whether to display and/or how to display the notification. Rather than a complicated algorithm, the adaptive algorithm can be a simple rules-based approach. For example, if the notification was previously rejected once, then the algorithm can decide to only display the notification 80% of the time, rejected twice, then 60% of the time, rejected three times, then 40% of the time, etc. The adaptive algorithm can also decide to immediately display the notification on the display 340. Or the adaptive algorithm can decide the manner in how it is displayed. For example, instead of an automatic pop-up notification, the message notification can be made available if the user affirmatively accesses a message area to view messages. Such is the case for message notifications that have a lower ranking. Conversely, message notifications having a high ranking can be automatically displayed in a pop-up window (including a toolbar). Thus, the mode of displaying modifications can be altered based on a determined ranking.

Other data can be input into the adaptive notification algorithm 330. For example, at 350, other system state or context information can be used by the adaptive algorithm. Context information can be based on geographic location. For example, if an email is received from a friend in Vancouver and the user is currently traveling in Vancouver, then the email notification can be increased in ranking. Thus, a mobile phone can calculate or otherwise determine the geographic location using a local GPS receiver and modify the notification ranking in response thereto. One example of system state information can be that if a phone has a low battery, then vibrations or screen activation can be suppressed so as to conserve energy. Instead, the user can obtain the notification the next time the user initiates screen activation. At 360, data of similar users that received similar notifications can also be used by the adaptive algorithm. For example, if a wireless network notification associated with a condo development has been rejected in the past by 99% of the users, then the notification ranking is reduced.

It should be noted that any information collected from the user can have opt-in consent, wherein the user can take an affirmative action before the data is collected to agree to the data collection. Alternatively, implied consent can be given whereby doing nothing in response to a notification implies that data can be collected.

Figure 4:
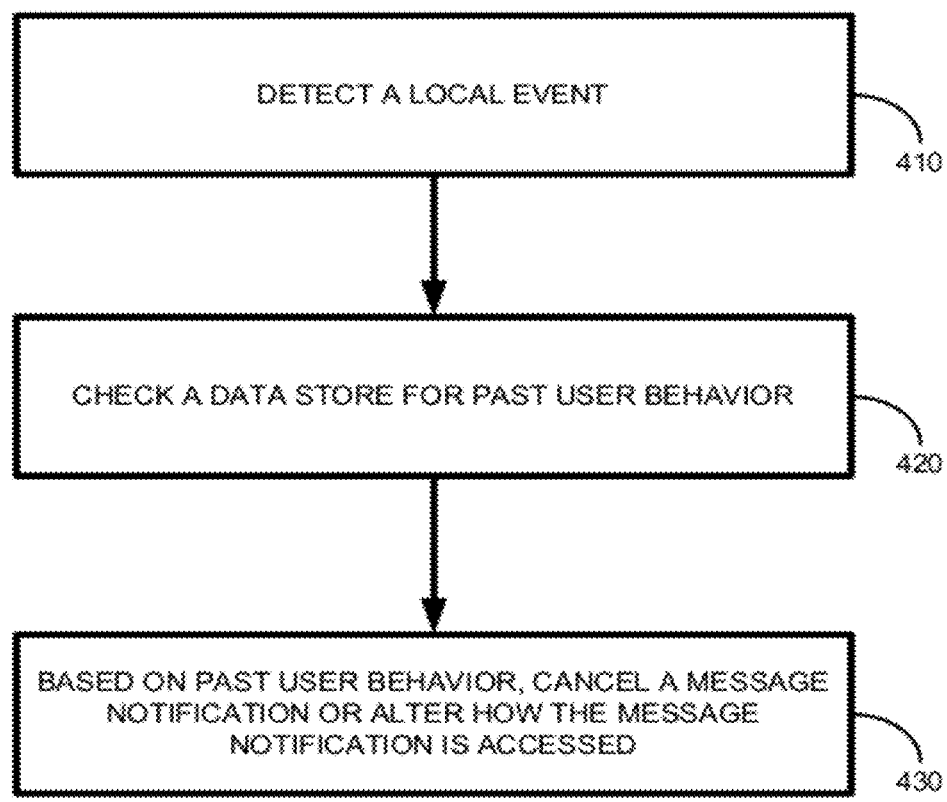
FIG. 4 is a flowchart of another embodiment wherein notification handling is based on detection of a local event.

FIG. 4 is a flowchart of a method for adapting how notifications are displayed based on a local event. In process block 410, a local event can be detected. For example, a Bluetooth device can be detected or a wireless network can be detected. The event is local in that the detection originated in the mobile device itself. In process block 420, a data store is checked for past user behavior. For example, the data store can store a number of times that a user rejected or ignored (generally, disinterested in the message) a similar message notification, such as an identical message notification. Alternatively, a number of times the user accepted the message notification can be stored. In process block 430, based on the past user behavior, a message notification can be canceled (meaning that it is not reported to the user) or the message notification can be altered in terms of how it is accessed. By altering the message notification, the notification is treated differently than how it was previously presented to the user. For example, the last time the notification was displayed, it could have been displayed as a pop-up notification, whereas due to a reduced ranking, it can now be relegated to a folder that the user can access at their leisure, but without the interruption of a pop-up window.

Figure 5:
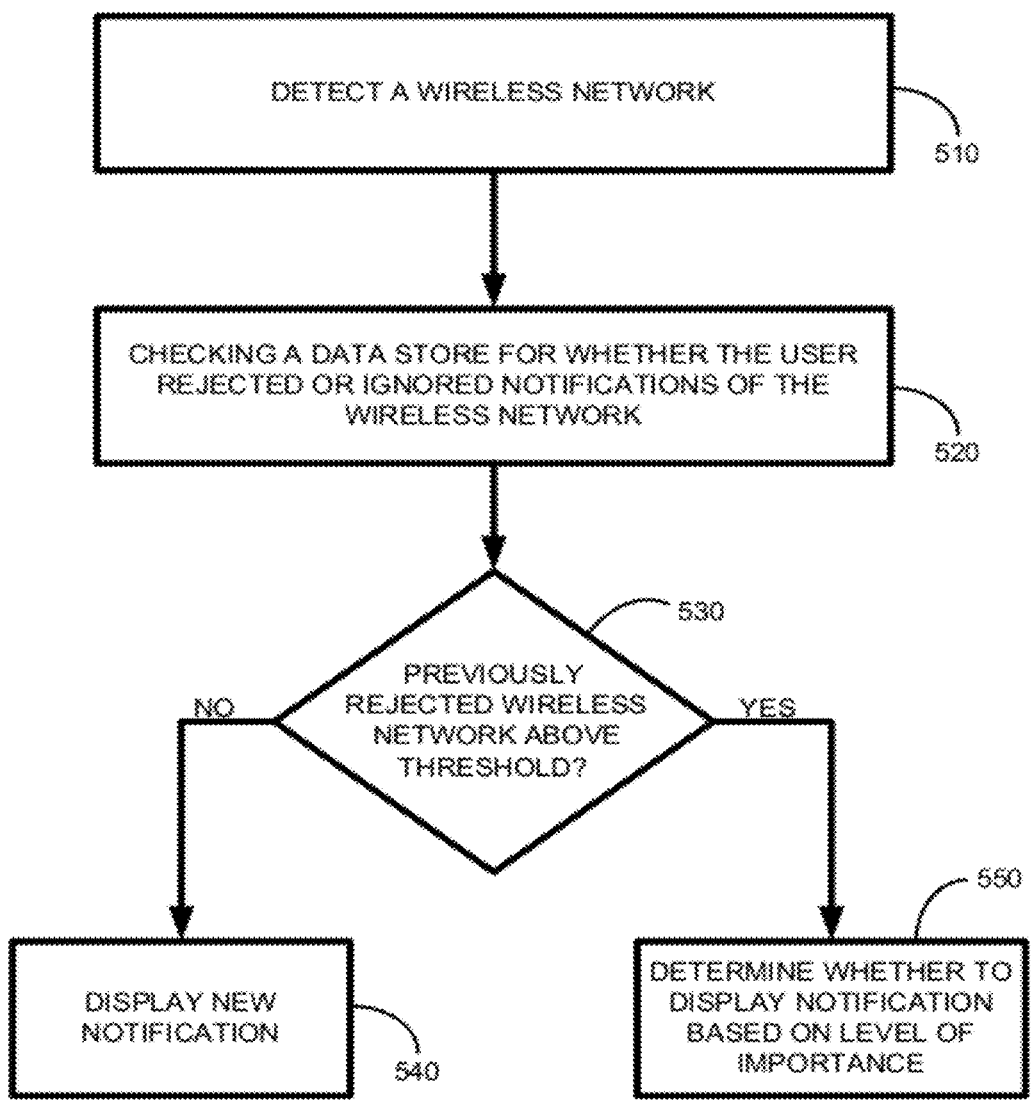
FIG. 5 is a flowchart of a particular example where message notification is adapted in response to detection of a wireless network.

FIG. 5 is a flowchart of a particular method relating to a wireless network notification. In process block 510, a wireless network is detected by a mobile phone. Such a detection is local in the sense that no external push notification was received by the phone. In process block 520, a data store is checked to determine whether the user previously rejected or ignored previous notifications for the same wireless network. For example, if the current notification is from a Starbucks® network, then that network information is retrieved from the data store by searching for the Starbucks network as the key. The ranking can then be obtained from the data store or calculated dynamically based on associated stored data. In decision block 530, a check is made whether the retrieved information indicates that one or more previous message notifications were rejected more than a threshold number of times. If not, then in process block 540, the new notification of the detected wireless network is displayed in a pop-up notification. If yes, then in process block 550, a determination is made whether to display the notification based on a ranking level. The ranking level can be based on many different parameters, and the particular parameters that are used depends on the design. However, some example parameters are described in relation to FIG. 6.

Figure 6:
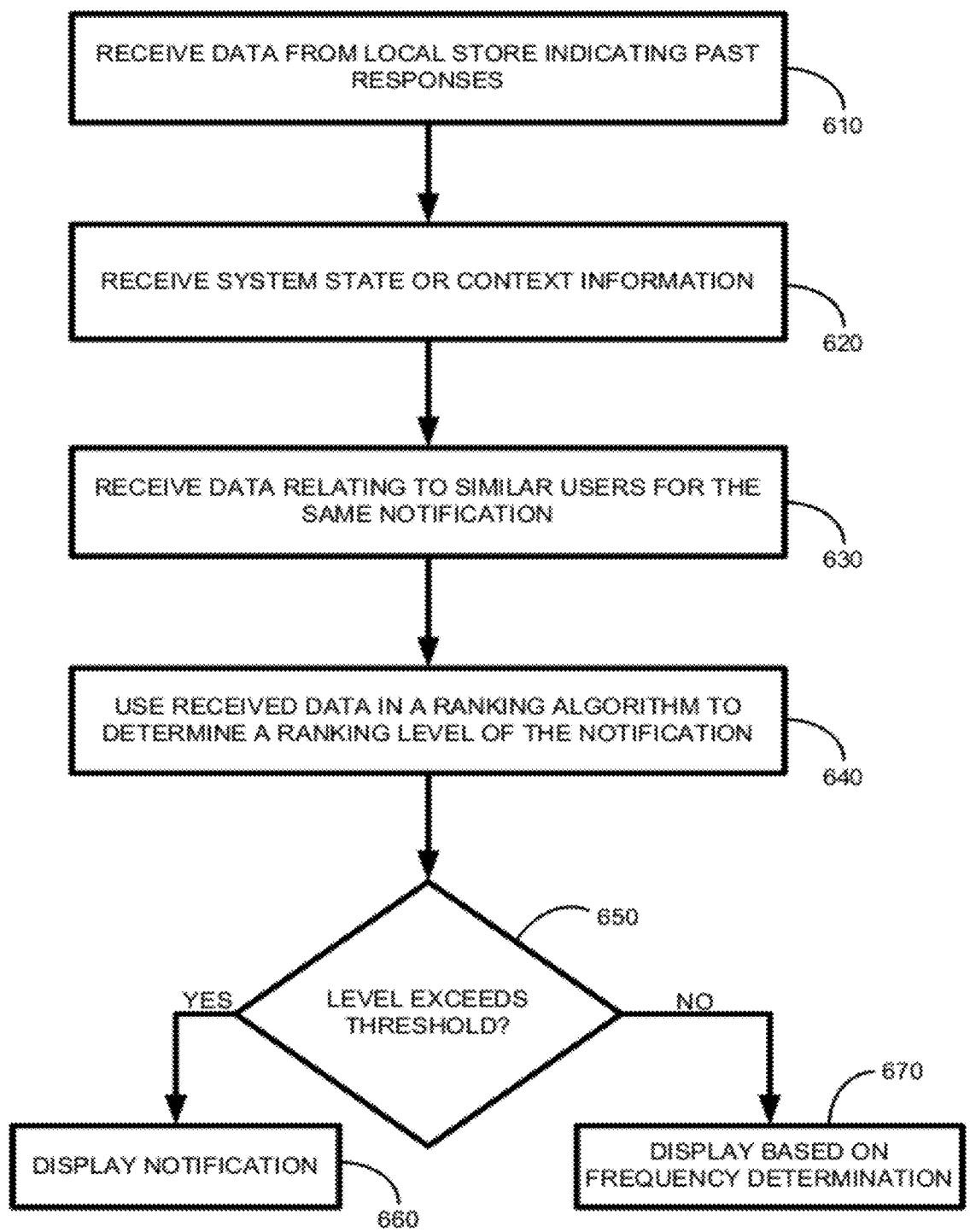
FIG. 6 is a flowchart of a method showing multiple input parameters that can be used in determining whether and/or how to display a message notification.

FIG. 6 is a flowchart of a method showing different potential parameters. One or more of these parameters can be used. In process block 610, data is received from a local store indicating past responses. In process block 620, system state and/or context information is retrieved. Such context information can, for example, be based on location readings obtained from a GPS unit on the mobile phone. In process block 630, data is received regarding similar users that received the same notification. In process block 640, a ranking algorithm is used to determine a ranking level based on one or more of the above-mentioned parameters. In decision block 650, a determination is made whether the ranking level exceeds a predetermined threshold. If yes, the notification is displayed (process block 660). If not, then in process block 670, a frequency determination is made regarding the frequency the message notification was previously displayed. If the frequency is below a predetermined range based on the determined level of ranking, then the message is displayed. Otherwise, the message is supressed.

Figure 7:
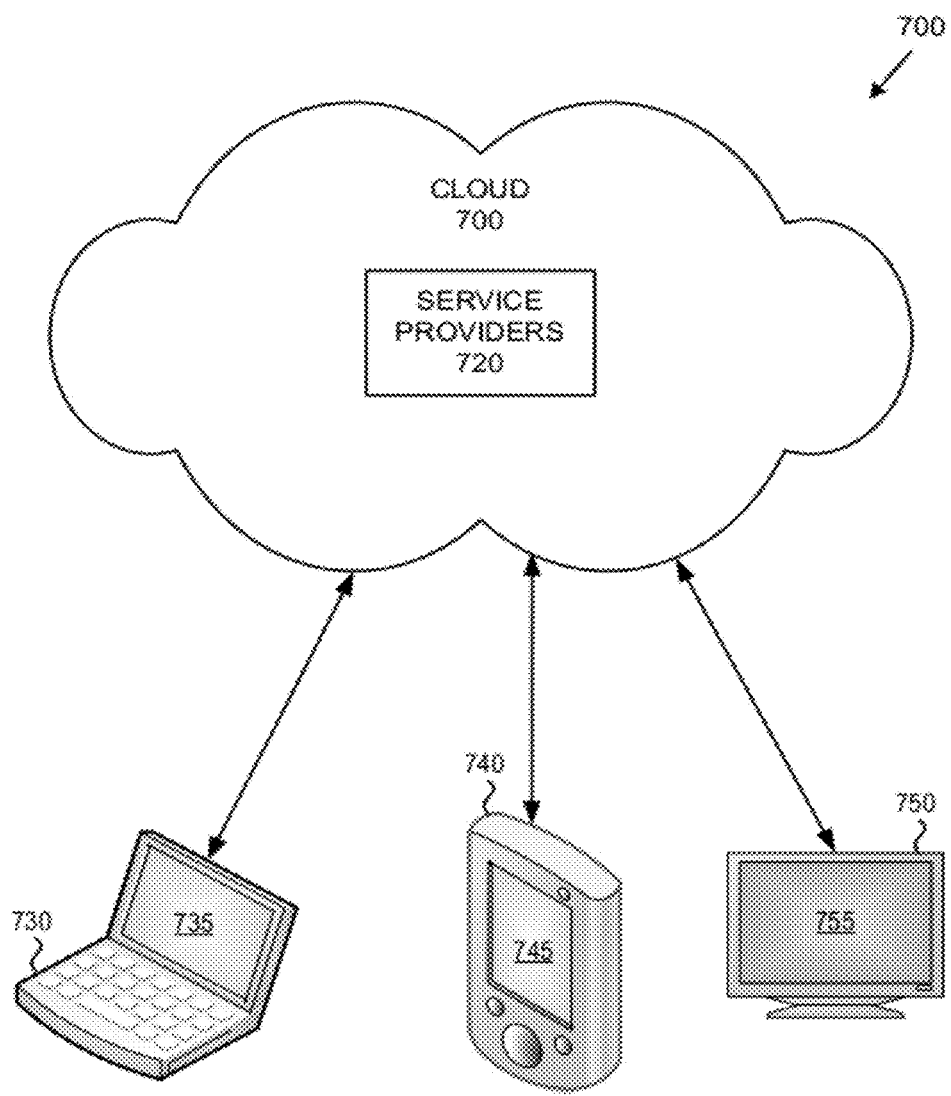
FIG. 7 is a system wherein a network can be used to determine how to modify message notification across various devices.

FIG. 7 illustrates a generalized example of a suitable implementation environment 700 in which described embodiments, techniques, and technologies may be implemented.

In example environment 700, various types of services (e.g., computing services) are provided by a cloud 710. For example, the cloud 710 can comprise a collection of computing devices 730, 740, 750, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710. In terms of adaptive notifications, a modification in a way notifications are displayed on one device can be duplicated across all devices. For example, if one user has a laptop and a mobile phone, notifications can be adapted on both in a like manner to provide a more universal experience for the user. The cloud can also maintain the data store of past user behavior and maintain or compute rankings for the notifications.

In example environment 700, the cloud 710 provides services for connected devices 730, 740 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, and the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens.

Services can be provided by the cloud 710 through service providers 720, or through other providers of online services (not depicted). For example, cloud services can be customized to the screen size, display capability, and/or touch screen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of adapting notifications displayed on a computing device, comprising:
   displaying a message notification, which is displayed in response to detection of a wireless network;
   monitoring behavior of rejecting the message notification or inaction in response to the message notification; and
   in response to the rejection or inaction, modifying whether future similar message notifications are displayed.

2. The method of claim 1, wherein the message notification is a first message notification and wherein modifying future similar messages further includes:
   prior to displaying a second message notification associated with the event, checking a data store for past user behavior in response to a same message notification; and
   based on the past user behavior, either canceling the second message notification or altering how the second message notification is accessed.

3. The method of claim 2, wherein altering how the second message notification is accessed includes making the message notification accessible without displaying a pop-up window.

4. The method of claim 1, wherein modifying the frequency of future similar messages includes determining a ranking level based on system state or context information.

5. The method of claim 1, wherein the message notification is displayed on a mobile phone and the message originates from the mobile phone.

6. The method of claim 1, wherein the message notification is an automatically displayed pop-up window.

7. A method of adapting notifications, comprising:
   displaying a first pop-up notification in response to a first event, the first event being detection of one or more of the following: that a wireless network is available, that a battery is low on remaining power, that there is a roaming status change, that there is a time zone change, or that there is a time change;
   monitoring a user's response to the first pop-up notification;
   determining whether the user's response showed interest or disinterest through inaction in the first pop-up notification;
   if the user's response showed interest, displaying a second pop-up notification that is similar to the first pop-up notification upon detection of a second event; and
   if the user's response showed disinterest, suppressing the second pop-up notification.

8. The method of claim 7, wherein suppressing the second pop-up notification includes making information about the second event available, but without a pop-up notification.

9. The method of claim 7, wherein the first and second pop-up notifications are displayed on a mobile phone and the first and second pop-up notifications are notifications that originate from a local event detection on the mobile phone itself.

10. The method of claim 7, further including storing information indicating whether the user's response to the first pop-up notification showed interest or not.

11. The method of claim 7, further including using a ranking algorithm to determine whether to display the second pop-up notification or changing a way in which the notification is displayed, or changing information provided with the notification.

12. The method of claim 11, wherein the ranking algorithm takes into account past responses to a similar notification received from the user, context information, state information and/or past responses to a similar notification received from other users.

13. The method of claim 7, wherein the first and second events are a local detection of a wireless network.

14. A method of adapting pop-up notifications on a mobile phone, comprising:

detecting a local event on the mobile phone, wherein the local event is a detection of one or more of the following: a wireless device, a low battery, a roaming status change, a time zone change, or a time change; and determining whether to display a notification on the mobile phone in response to the detection of the local event based on a ranking level of the local event to a user;

wherein determining includes the following:

retrieving data from a local data store indicating one or more past responses to similar notifications and using the data in determining whether to display the notification;

based on the determination, either displaying a pop-up notification if the ranking level exceeds a threshold or not displaying the notification if the ranking level does not exceed the threshold.

15. The method of claim 14, wherein the determining further includes calculating a geographic location and using the geographic location to determine the ranking level.

16. The method of claim 14, wherein the local event is a detection of a wireless network.

17. The method of claim 14, wherein the determining further includes retrieving data indicating past responses of other users to one or more past responses of similar notifications.

* * * * *